HIGH SPEED COMPLEMENTING FLIP FLOP

Filed Dec. 28, 1956

INVENTOR.
ALFRED ROESCH, JR.
BY
ATTORNEY

United States Patent Office 2,885,574
Patented May 5, 1959

2,885,574

HIGH SPEED COMPLEMENTING FLIP FLOP

Alfred Roesch, Jr., West Chester, Pa., assignor to Burroughs Corporation, a corporation of Michigan Application December 28, 1956, Serial No. 631,091
8 Claims. (Cl. 307—88.5)

Figure 1:
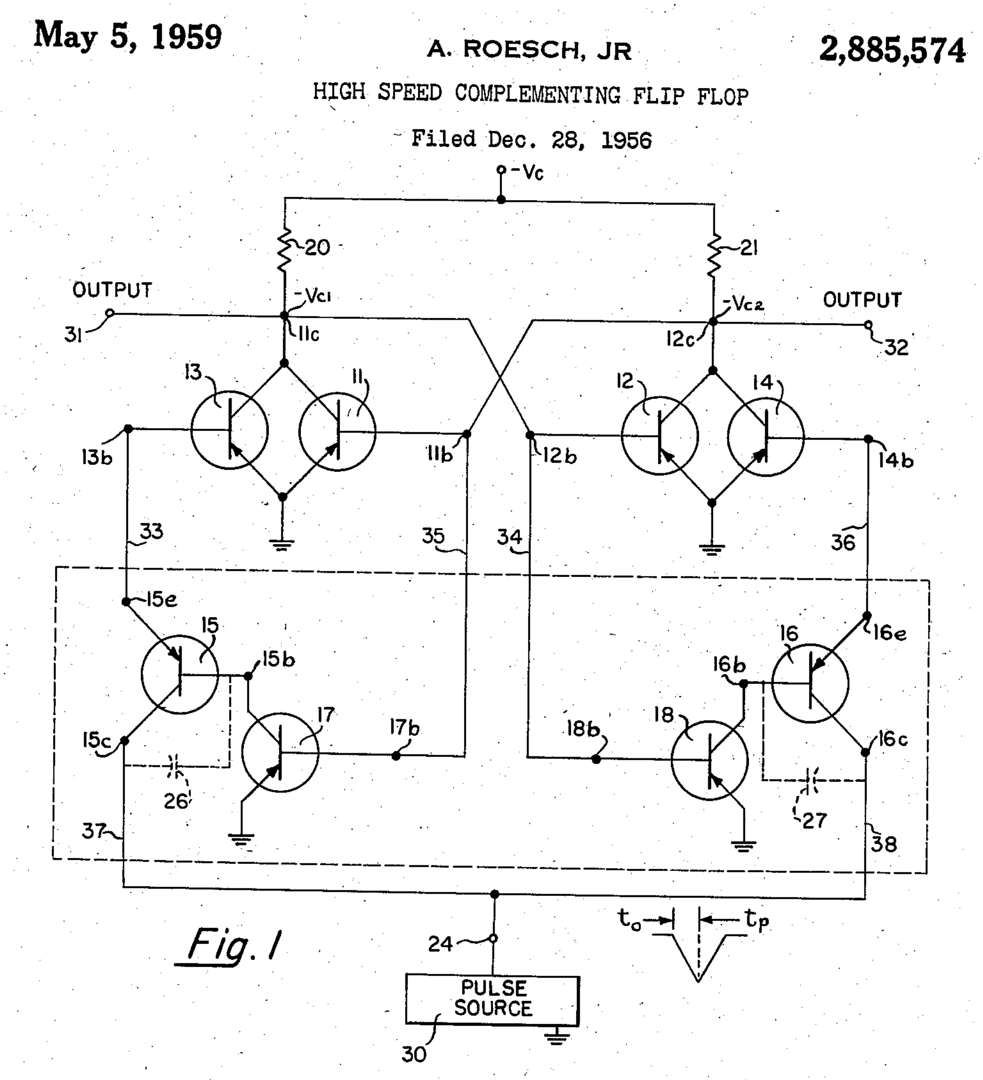

This invention relates to a bistable electronic circuit commonly referred to as a flip flop. More particularly, the invention relates to a high-speed complementing flip flop incorporating a new form of inhibit gate.

As is well known, a flip-flop circuit will remain in either one of its two stable states until caused to change to its other state by some external force, as by the application of a proper signal. Flip-flop circuits may be either non-complementing or complementing.

A non-complementing flip flop has two input terminals and will change its state only in response to a pulse of given polarity applied to one of its two input terminals; if such a pulse is applied to its other terminal, the flip flop will remain in its resident state.

A complementing flip flop, on the other hand, requires but a single input terminal and, in response to a proper pulse properly applied, will change to its other state irrespective of which one of its two states it was in at the time of the application of the pulse.

A non-complementing flip flop may be converted into a complementing flip flop by the addition of steering or inhibit gates which function to pass the externally applied pulse, or a signal derived therefrom, to a particular one of the two input terminals of the otherwise non-complementing flip-flop circuit which will cause the flip flop to change its state, and to inhibit application of a signal to the other input terminal. For example, in one form of complementing flip flop, two gates are employed one of which at any one time is "enabled" and the other of which is "disabled," according to the state of the flip flop. The gate which is connected to that one of the two input terminals of the flip flop per se which in response to a signal will cause the flip flop to switch is made enabled; the other is disabled. The externally applied pulse, which may be referred to as the input pulse, is applied to both gates, but only the enabled gate passes a signal; the disabled gate inhibits passage of any signal. The signal passed by the enabled gate is effective, in the absence of a signal through the disabled gate, to change the flip flop to its other state.

In such a device as the above, some means must be provided which, in response to the change of state of the flip flop, or in response to some subsequent event, is effective to reverse the status of the gates in anticipation of the arrival of the next input pulse. That is, some means must be provided to disable the enabled gate, and to enable the disabled gate, prior to the application of the next input pulse.

In those complementing flip flops wherein the status of the gates is reversed in response to the change of state of the flip flop, it will be seen that if the gates were permitted to reverse their status prior to the termination of the input pulse, the gate which was disabled at the start of the input pulse would now be enabled and, in response to the continuing input pulse, would pass a signal to the flip flop per se which would again change its state, i.e., would return the flip flop to the state it was in at the time the input pulse was first applied. Thus, the flip flop would continue to change state in an oscillatory manner as long as the input pulse were present, and the final state of the flip flop would be a function of the duration of the input pulse. This action is known as time race.

While time race, in a single flip flop, may be prevented by the employment of delay lines or other means to delay the reversal of the gates for a fixed period of time following the change of state of the flip flop, and then restricting the width of each input pulse to less than the chosen delay period, such a method becomes unsatisfactory where a number of flip flops are cascaded, as in a counter. Here, it becomes necessary to provide pulse standardizers between the stages, or to provide the equivalent internal action limiting the effective duration, or more specifically, the amplitude-time product, of the input pulses. Due to the design tolerances required for the delay and pulse-standardizer circuit, the maximum pulse repetition frequency of a complementing flip flop of the type above described is not as high as it could be were time race not a factor. Accordingly, such circuits are not as fast as is desired for some purposes.

Time race is avoided in some complementing flip-flop circuits by the employment of means which prevent the status of the gates from reversing until the input pulse is over. The action has been referred to as "conditional steering" since the respective status of the steering or inhibit gates is "conditional" upon the removal of the input pulse. While the employment of conditional steering avoids time race, additional components are required to accomplish the conditional steering, and these add to the cost and complexity of the equipment.

An important object of the present invention is to provide a complementing flip-flop circuit of relatively simple design capable of operating at high speed, as for example, at a speed up to ten megacycles.

Another object is to provide a high-speed complementing flip-flop circuit so designed that the steering or inhibit gates may be reversed in response to the change of state of the flip flop without danger of time race.

Another object is to provide a reliable high-speed complementing flip flop not subject to time race and not employing the additional components ordinarily required for conditional steering.

Another object is to provide a transistorized high-speed complementing flip flop employing an improved form of steering or inhibit gate.

Another object is to provide a new form of steering or inhibit gate useful in flip flop and other circuits.

These and other objects are accomplished by employing a gate which when made enabled passes the leading edge or ramp of the applied pulse but prevents passage of the remaining portion of the pulse; of course, when disabled the gate inhibits passage of any portion of the pulse.

While the inhibit gate of the present invention may be used in circuits other than flip flops, as for example, in ring counters, the gate may be employed to particular advantage in a complementing flip flop, and when so employed provides a high speed circuit of good reliability.

In a preferred form of complementing flip flop employing the present invention, the circuit uses eight PNP junction transistors of the surface barrier type. Two of these transistors function as the flip flop per se, two others are set-and-reset trigger transistors, two others function as steering gates, and the remaining two function as gate inhibitors. The combination of a steering-gate transistor and a gate-inhibitor transistor forms what may be called an inhibit gate.

When the flip flop is in one of its two stable states, the base-emitter junction of the gate-inhibitor transistor of one gate is forward biased while the base-emitter junction of the other is zero biased. When the negative input pulse which is intended to switch the flip flop appears at the input terminal of the circuit, the pulse is applied simultaneously across the two gates, each of which functions as a differentiating circuit. One of the two gates, namely, the gate in which the base-emitter junction of the gate-inhibitor transistor is forward biased, looks to the leading edge of the input pulse like the parallel combination of a capacitance and a high resistance (the steering-gate transistor) connected to ground through the negligibly low collector-to-emitter impedance of a bottomed transistor (the gate-inhibitor transistor). The other gate looks to the input pulse like the parallel combination of a high resistance and a capacitance (the other steering-gate transistor) connected to ground through the high collector-to-emitter impedance of a biased "off" transistor (the other gate-inhibitor transistor).

While the collector-to-base capacitance of a steering-gate transistor varies in accordance with the conduction state of the said transistor, its value at all times is small, and the impedance offered thereby to the negative-going leading edge or ramp of the applied input pulse is always large relative to the very low collector-to-emitter impedance of that gate-inhibitor transistor whose base-emitter junction is forward biased. In effect, the base of the steering-gate transistor in this gate is clamped to ground at least so long as the base-emitter junction of the gate-inhibitor transistor is forward biased. Consequently, until the gate-inhibitor transistor becomes biased "off" and unsaturated, the steering-gate transistor of this branch is inhibited from turning "on" and the gate may be said to be disabled. The action will be discussed in more detail hereinafter.

The situation at the other gate is, however, different. There, the gate-inhibitor transistor is not forward biased and its collector-to-emitter internal impedance is not low relative to the impedance offered by the collector-to-base capacitance of the steering-gate transistor to the negative-going leading edge or ramp of the input pulse. Hence, the base of the steering-gate transistor is not clamped to ground and its base-emitter junction does become forward biased by the leading edge of the input pulse. This gate may, therefore, be said to be enabled.

In the preferred form of flip-flop, later to be described in detail, the emitter of each steering-gate transistor is connected to the base of a trigger transistor. The leading edge of the input pulse passes through the enabled gate and appears at the base of that gate's trigger transistor. The said trigger transistor then bottoms and its collector potential rises to ground. This turns off the flip-flop transistor which had been bottomed. The collector potential of the latter transistor goes negative and this has the effect of turning on the flip-flop transistor which had been cut off. It will be seen, then, that the flip-flop has changed its state in response to the leading edge of the input pulse.

When the flip-flop changes its state, the potential at the collector of each flip-flop transistor is the reverse of that which had obtained when the flip-flop was in its previous state. And, since the collector of each flip-flop transistor is connected directly to the base of a different one of the gate-inhibitor transistors, it will be seen that, as a result of the flip-flop changing its state, the biasing on the gate inhibitors has been reversed. This has the effect of disabling, to the next negative-going input pulse, the gate which had been enabled and of enabling the gate which had been disabled.

There is no danger of time race in the flip-flop circuit of the present invention, provided only that the rise time of the input pulse is not longer in duration than the rise time of that trigger transistor which turns off both the bottomed flip-flop transistor and the bottomed gate-inhibitor transistor plus the hole storage of the said gate-inhibit transistor which was bottomed. This is discussed in greater detail later. The duration of the input pulse after it has reached its maximum constant amplitude is immaterial so far as the action of the circuit and time race are concerned, since the collector-to-base inherent capacitance of each steering-gate transistor is effective to block the application of the continuing constant-amplitude portion of the pulse to the base of the steering-gate transistor, and thereby to prevent the pulse from reaching the trigger transistor.

Figure 2:
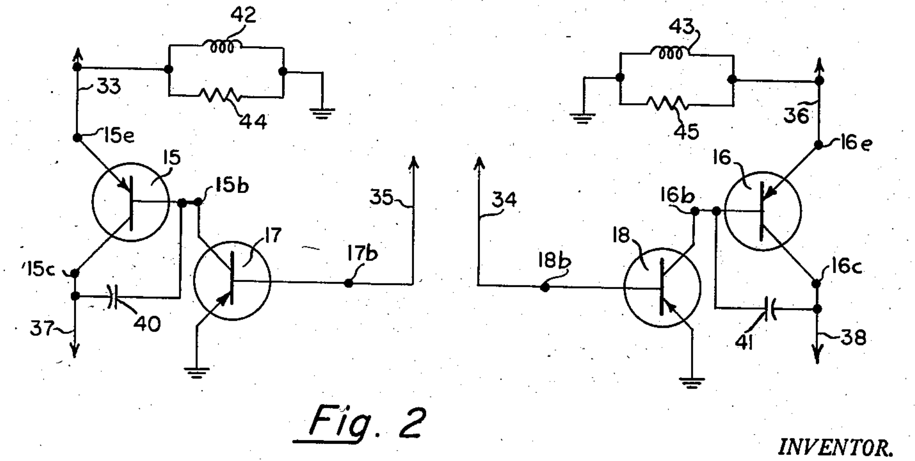

While the foregoing is a summary, the invention will be best understood from a detailed description of a preferred embodiment taken together with the drawing wherein:

Fig. 1 shows a schematic of high-speed transistor complementing flip-flop circuit embodying, in a preferred form, the present invention, and Fig. 2 shows a modification of the inhibit gate used in the circuit of Fig. 1.

Referring now to Fig. 1, there is shown a complementing flip-flop circuit comprising eight interconnected PNP junction transistors which are preferably of the surface-barrier type L-5129 and which are identified in the drawing by the reference numerals 11 to 18. Transistors 11 and 12 function as the flip-flop per se; transistors 13 and 14 function as the set-reset triggers for flip-flop transistors 12 and 11, respectively; transistors 15 and 16 function as steering gates; and transistors 17 and 18 function as gate inhibitors. Each combination of steering-gate transistor and a gate-inhibitor transistor, composed of transistors 15 and 17, or transistors 16 and 18, functions as an inhibit gate. The two inhibit gates thus formed are shown in Fig. 1 within the dotted rectangle.

The emitters of transistors 11, 12, 13, 14, 17 and 18 are connected directly to ground. The emitters of steering-gate transistors 15 and 16, are connected directly to the bases of trigger transistors 13 and 14, respectively. The collector of flip-flop transistor 11 is connected directly to the collector of trigger transistor 13, and is also connected directly to the bases of flip-flop transistor 12 and gate-inhibitor transistor 18. The collector of flip-flop transistor 12 is connected directly to the collector of trigger transistor 14; also directly to the bases of flip-flop transistor 11 and gate-inhibitor 17. The collectors of the flip-flop transistor 11 and 12 are also connected by way of resistors 20 and 21 to a common source of negative D.-C. voltage, $-V_c$. The collectors of the steering-gate transistors 15, 16 are connected directly to an input terminal 24. A source 30 of negative pulse voltage is shown connected to the input terminal 24.

The operation of the circuit of Fig. 1 will first be described more or less generally. Later the action will be described in greater detail so as to bring out clearly why the circuit is capable of operating at very high speed.

Assume that at a time $t_0$ the transistor 11 is bottomed, i.e., is conducting at saturation. Throughout this specification it will be convenient to describe a transistor which is conducting at saturation as being "bottomed." The collector-to-emitter resistance of a bottomed transistor is negligibly low and throughout this specification it will be assumed that the potential at the collector of a bottomed transistor is equal to that at the emitter. Actually, the potential difference therebetween may be of the order of 0.1 volt. Thus, in a PNP junction transistor which has bottomed, the collector potential is positive with respect to the base and the base-collector junction is forward biased.

If we assume, then, that at time $t_0$ the flip-flop transistor 11 is bottomed, it follows from what has just been said above that its collector 11*c* is at ground potential. Since the collector 11*c* is connected directly to the bases 12*b* and 18*b* of transistors 12 and 18, respectively, it follows that the bases of these transistors are also at ground potential. And, since the emitters of transistors 12 and 18 are connected to ground, it will be seen that the base-emitter junctions of these transistors are not biased in the forward direction and that the transistors are consequently "off." The flip-flop transistor 12 being "off," its collector 12*c*, and hence also the bases 11*b* and 17*b* of transistors 11 and 17, respectively, are clamped at a negative potential $-V_{c2}$ determined by the value of the negative source $-V_c$, resistor 21, and the input characteristics of transistors 11 and 17. Accordingly, the base-emitter junctions of transistors 11 and 17 are biased in the forward direction, and flip-flop transistor 11 is maintained bottomed.

With flip-flop transistor 11 bottomed and flip-flop transistor 12 cut off, the collector of trigger transistor 13 is at ground potential, while the collector of trigger transistor 14 is at the negative potential $-V_{c2}$.

The foregoing describes the condition of the circuit of Fig. 1 prior to the application of a negative pulse from source 30 to the input terminal 24.

When the negative pulse from source 30 is applied to the input terminal 24, the leading edge or ramp of the pulse passes through the collector-to-base inherent capacitance of each of the steering-gate transistors 15 and 16, represented in Fig. 1 by the dotted capacitors 26 and 27, to the bases 15*b* and 16*b*, respectively. Thus, the leading edge of the pulse is also applied across the collector-to-emitter internal impedance of the gate-inhibitor transistors 17, 18. Since the base-emitter junction of gate-inhibitor transistor 17 is forward biased, by reason of the negative potential of the collector 12*c* appearing at the base 17*b*, the internal collector-to-emitter impedance of transistor 17 is very low relative to the impedance offered to the leading edge of the pulse by the inherent capacitance 26. Thus, the capacitance 26 charges very quickly to the voltage of the pulse and substantially all of the pulse voltage appears thereacross. The base of steering-gate transistor 15 is effectively clamped to ground, and substantially none of the pulse voltage appears across the base-emitter junction of steering-gate transistor 15 and none across the base-emitter junction of trigger transistor 13, it being seen that these two base-emitter junctions are serially connected between the base of transistor 15 and ground. Hence, the base emitter junctions of steering-gate transistor 15 and of trigger transistor 13 are not forward biased by the applied negative pulse and these transistors remain cut off.

The leading edge of the negative pulse applied to input terminal 24 also passes through the collector-to-base inherent capacitance 27 of steering-gate transistor 16 and to the base 16*b*, and thus is applied across the collector-to-emitter internal impedance of gate-inhibitor transistor 18. The base-emitter junction of gate-inhibitor transistor 18 is zero biased since its base is at ground potential as determined by the collector potential of the bottomed flip-flop transistor 11. Thus, the collector-to-emitter internal impedance of gate-inhibitor transistor 18 is high relative to the impedance offered to the leading edge of the pulse by the capacitance 27, and the leading edge of the applied voltage pulse therefore drives the base 16*b* negative. The base-emitter junction of steering-gate transistor 16 is thus forward biased, the transistor 16 turns on, transistor action occurs, and the leading edge of the pulse is applied through steering-gate transistor 16 to the base 14*b* of trigger transistor 14. Trigger transistor 14 is thereby forward biased, the transistor bottoms, and its collector which is tied directly to the collector 12*c* of flip-flop transistor 12, rises to ground potential. This biases off the other flip-flop transistor 11, and the collector 11*c* of flip-flop transistor 11, which is tied directly to the collector of trigger transistor 13, falls to the negative potential $-V_{c1}$, as determined by the value of the negative source $-V_c$, the resistor 20, and the input characteristics of transistors 12 and 18.

Thus, as a result of the application of the negative-going leading edge of the pulse to the terminal 24, the flip flop has changed its state, as is seen from the fact that flip-flop transistor 12 which was originally cut off is now bottomed, and flip-flop transistor 11 which was originally bottomed is now cut off. The newly acquired state of the flip flop is then maintained until the next negative pulse from source 30 is applied to the input terminal 24.

With the flip flop in the state just acquired, in which transistor 12 is bottomed and transistor 11 is cut off, the base-emitter junction of gate-inhibitor transistor 18 is now forward biased, since its base is at the negative potential of the collector 11*c* of the cut-off transistor 11. The other gate-inhibitor transistor 17 is now biased off since its base is connected to the collector of the bottomed transistor 12. Thus, the status of the gate-inhibitor transistors is the reverse of that which obtained prior to the change of state of the flip flop.

It will be recalled that when the leading edge of the negative pulse was applied to the two gates, the capacitance 26 charged rapidly to the voltage of the pulse. Capacitance 27 also charged, in response to the leading edge of the pulse, though more slowly than did capacitance 26, since capacitance 27 charged through the transistors 16 and 14 neither of which was forward biased at the instant of application of the pulse. When the negative pulse is removed, it is necessary that the capacitances 26 and 27 discharge in order that the circuit may be ready to accept the next negative input pulse. Discharge of capacitance 27 occurs very rapidly through the very low collector-to-emitter impedance of the now bottomed inhibit-gate transistor 18. Capacitance 26, on the other hand, must discharge through the collector-base junction of the now cut-off inhibit-gate transistor 17, but in so discharging the collector-base junction of transistor 17 becomes forward biased which causes transistor action and creates a low impedance path (about 100 ohms). Thus, the discharge of capacitance 26 is also very rapid.

When the next, i.e., second, negative pulse from source 30 is applied to input terminal 24, the leading edge of the pulse is applied across the serially connected collector-to-base inherent capacitance 27 of transistor 16 and the negligibly low collector-to-emitter internal resistance of gate-inhibitor transistor 18 whose base-emitter junction is now forward biased. The base of steering-gate transistor 16 is therefore clamped to ground and, as a consequence, the pulse does not turn on transistor 16. The leading edge of the negative pulse from source 30 is also applied, however, through the collector-to-base inherent capacitance 26 of steering-gate transistor 15 and appears across the relatively high collector-to-emitter internal resistance of gate-inhibitor transistor 17 which is biased off. As a consequence, the base of steering-gate transistor 15 is driven negative, transistor action occurs, and the leading edge of the negative pulse is applied through transistor 15 and across the base-emitter junction of trigger transistor 13 which quickly bottoms since its collector is connected to a source of negative potential $-V_{c1}$. When the trigger transistor 13 bottoms, its collector rises to ground potential, and since its collector is connected directly to the base 12*b* of the other flip-flop transistor 12, the transistor 12 is biased off. Its collector 12*c* falls to the negative voltage $-V_{c2}$ and, since collector 12*c* is connected directly to the base 11*b*, the flip-flop transistor 11 is biased on and quickly bottoms. As a result of this change in the state of the flip flop, the base-emitter junction of the gate-inhibitor transistor 17 becomes forward biased whereas that of the gate-inhibitor transistor 18 becomes zero biased. It will be observed that this status of the gate-inhibitor transistor is the reverse of that which obtained at the time of the application of the second pulse. The capacitances 26 and 27 discharge in a manner comparable to that previously described and the circuit is now in condition to receive the next, i.e., third, pulse from source 30. It will have been noted from what has been said that transistor 13 is the trigger transistor for flip-flop transistor 12 and that transistor 14 is the trigger transistor for flip-flop transistor 11.

As indicated previously in the summary of the invention, the high speed complementing flip flop of the present invention is not subjected to the danger of time race provided that input pulses of such fast rise time be employed that the rise or ramp portion of the pulse is over by the time the inhibiting gate-inhibitor transistor becomes uninhibiting, i.e., unsaturated. This will be clear from the following consideration: Assume that when the input pulse is applied transistor 17 is the inhibiting transistor. The time required for transistor 17 to become uninhibiting is dependent upon the rise time of the trigger transistor 14 and the recovery time of the transistor 17 itself. By recovery time is meant, of course, the time required for the transistor 17 to become unsaturated, it being understood that due to minority carrier storage (hole storage in a PNP transistor) a saturated transistor does not become unsaturated the instant the forward bias is removed.

If the negative-going leading edge of the input pulse is over and the collector-to-base capacitance 26 is charged to the peak negative amplitude of the input pulse before the gate-inhibitor transistor 17 becomes uninhibited, the extended duration of the input pulse has no further effect on the operation of the circuit and the inhibit gate, comprising the transistors 15 and 17, may be said to have been disabled so far as the applied pulse was concerned.

With surface barrier PNP transistors L–5129 connected in the manner shown in Fig. 1, the charge time of the collector-to-base capacitance 26 is negligible compared with the hole storage time of the gate-inhibitor transistor 17 since the capacitance 26 is small and the saturation resistance of transistor 17 is only a few ohms. A typical hole storage time is .05 microsecond whereas the RC time constant of the capacitance charging circuit is $10^{-4}$ microseconds, where R is the saturation resistance of transistor 17 (about 10 ohms) and C is the collector-to-base capacitance 26 (less than 10 micromicrofarads).

Referring now to Fig. 2 there is shown a modified inhibit-gate circuit which may be used in lieu of the inhibit gates used in the circuit of Fig. 1 as shown within the dotted rectangle. For like parts, the reference numerals used in Fig. 2 are the same as those used in Fig. 1. For example, leads 33 and 36 go from the emitters of steering-gate transistors 15, 16 to the bases of trigger transistors 13, 14; leads 35 and 34 go from the bases of the gate-inhibitor transistors 17, 18 to the bases of flip-flop transistors 11, 12; and leads 37, 38 go from the collectors of the steering-gate transistors 15, 16 to the input terminal 24.

In Fig. 2, external capacitors 40, 41 are shown connected between the collector and base of steering-gate transistors 15, 16 respectively. Such capacitors may be used where circuit operation is enhanced by their use.

Also shown in Fig. 2 are inductors 42, 43 connected from the leads 33, 36 to ground. These may be used to improve the temperature stability of the circuit by holding the bases of trigger transistors 13, 14 close to ground for D.-C., the inductors offering high impedance to the pulse transient. Resistors 44, 45 may be used where necessary to damp out any ringing that may be observed.

The inhibiting gate shown and described in Figs. 1 and 2 above has a number of advantages over prior art inhibiting-gate circuits of which I am aware. Among these advantages are the following: simple circuitry: very fast acting (operates at repetition rates up to 10 megacycles); requires but one power supply; lends itself readily to low-level direct-coupled circuit applications; operates with either PNP surface-barrier or NPN alloy junction transistors (if NPN junction transistors are used it is, of course, necessary to reverse the polarity of the input pulse voltage and also of the power supply voltage, as compared with those shown in Fig. 1).

It will be seen from what has been said that the new gate of the present invention makes possible a transistorized high speed complementing flip flop of simple construction which does not require, for freedom from time race, the additional components ordinarily required for conditional steering. Moreover, the flip-flop circuit described in this application may be cascaded many times without the employment of interstage pulse standardizers or their equivalent as is ordinarily required when conventional non-conditionally steered flip-flop circuits are connected in cascade.

As indicated in Fig. 1, the output of the flip flop may be taken from either or both of the collectors 11*c* and 12*c* of the flip-flop transistors 11 and 12, respectively.

What is claimed is:

1. A complementing flip-flop circuit comprising: a flip flop per se comprising two interconnected transistors, one of said flip-flop transistors being biased "on" and the other being biased "off" when the flip flop is in one of its two stable states and said other flip-flop transistor being biased "on" and said one transistor being biased "off" when the flip flop is in the other of its states; a separate trigger transistor for each flip-flop transistor, each of said trigger transistors being connected to be turned "on" by a signal and when so turned "on" connected to apply a signal to its flip-flop transistor to bias "off" said flip-flop transistor; an input terminal for receiving voltage pulses; and separate gates for each trigger transistor, each gate being arranged and connected, in response to one of said received pulses, to apply a signal to its associated trigger transistor when said trigger transistor's flip-flop transistor is biased "on" and to inhibit application of a signal to its associated trigger transistor when said trigger transistor's flip-flop transistor is already biased "off" at the time the input pulse is received, each said gate comprising: a steering-gate transistor and a gate-inhibitor transistor each having emitter, base and collector; conductive means connecting the base of the steering-gate transistor of each gate directly to the collector of its associated gate-inhibitor transistor; conductive means connecting the emitter of the gate-inhibitor transistor of each gate directly to a point of reference potential; conductive means connecting the base of the gate-inhibitor transistor of each gate to the output of a different one of said flip-flop transistors to sense the state of said flip flop and to bias "on" and thereby to saturate the gate-inhibitor transistor of one of said gates in response to said flip flop being in one of its two stable states and to bias "off" the gate-inhibitor transistor of the other gate; means connecting the emitter of each steering-gate transistor to the base of its associated trigger transistor; and means connecting the collector of each steering-gate transistor to said input terminal for applying pulses simultaneously to both of said collectors, whereby the leading edge only of an applied input pulse is effective to forward bias the base of the steering-gate transistor only of that gate whose gate-inhibitor transistor is not saturated, thereby to apply, in response to the turning "on" of said steering-gate transistor, a signal to the base of the associated trigger transistor to turn "on" said trigger transistor and thereby to turn "off" the associated flip-flop transistor.

2. A complementing flip-flop circuit comprising: a flip flop per se comprising two interconnected transistors, one of said flip-flop transistors being biased "on" and the other being biased "off" when the flip flop is in one of its two stable states and said other flip-flop transistor being biased "on" and said one transistor being biased "off" when the flip flop is in the other of its states: a separate trigger transistor for each flip-flop transistor, each of said trigger transistors being connected to be turned "on" by a signal applied to its base and when so turned "on" connected to apply a signal to its flip-flop transistor to bias "off" said flip-flop transistor; an input terminal for receiving voltage pulses; and separate gates for each trigger transistor, each gate being connected, in response to one of said received pulses, to inhibit application of a signal to the base of its associated trigger transistor when said trigger transistor's flip-flop transistor is already biased "off" at the time the input pulse is received, but to apply a signal to the said base when the associated trigger transistor's flip-flop transistor is biased "on," each said gate comprising: a steering-gate transistor and a gate-inhibitor transistor each having emitter, base and collector; means connecting the emitter of the steering-gate transistor of each gate to the base of its associated trigger transistor; means connecting the base of the steering-gate transistor of each gate directly to the collector of its associated gate-inhibitor transistor; means connecting the emitter of the gate-inhibitor transistor of each gate directly to a point of reference potential; means connecting the base of the gate-inhibitor transistor of each gate to the output of a different one of said flip-flop transistors to sense the state of said flip flop and to bias "on," and thereby to saturate, the gate-inhibitor transistor of one of said gates in response to said flip flop being in one of its two stable states and to bias "off" the gate-inhibitor transistor of the other gate; and means connecting the collector of each steering-gate transistor to said input terminal for applying pulses simultaneously to both of said collectors, thereby to forward bias and turn "on," in response to the leading edge only of an applied input pulse, the steering-gate transistor only of that gate whose associated gate-inhibitor transistor is not saturated, thereby to turn "on" the associate trigger transistor and thereby to turn "off" the flip-flop transistor which had been "on."

3. Apparatus as claimed in claim 2 characterized in that an inductor is connected between the base of each trigger transistor and said point of reference potential for offering relatively high impedance to the rising edge of a voltage pulse and relatively low impedance to a constant voltage.

4. Apparatus as claimed in claim 2 characterized in that a capacitor is connected between the collector and base of each of said steering-gate transistors for offering relatively low impedance to the rising edge of an applied voltage pulse and relatively high impedance to its constant value.

5. In a complementing flip-flop circuit, a pair of electronic gates, each of said gates comprising: first and second junction transistors each having emitter, base and collector; conductive means connecting the base of said first transistor directly to the collector of said second transistor; conductive means connecting the emitter of said second transistor directly to a point of reference potential; conductive means connecting the base of said second transistor to an output circuit of said flip flop to sense the state of said flip flop and to bias "on" and thereby to saturate said second transistor in response to said flip flop being in one of its two stable states and to bias "off" said second transistor in response to said flip flop being in its other state; means for applying an input pulse between the collector of said first transistor and said point of reference potential, whereby, in response to the leading edge only of an applied input pulse, a signal appears at the emitter of said first transistor only when said second transistor is unsaturated, the appearance of said signal at the emitter of said first transistor being inhibited when said second transistor is saturated, said inhibiting being due to the clamping of the base of said first transistor to said point of reference potential by the saturated second transistor; and means for utilizing said first-transistor emitter signal to change the state of said flip-flop circuit.

6. An electronic gate comprising: first and second junction transistors each having emitter, base and collector; means connecting the base of said first transistor directly to the collector of said second transistor; means connecting the emitter of said second transistor directly to a point of reference potential; a source of voltage whose value is subject to being at either of two levels; means connecting the base of said second transistor to said voltage source to sense the level thereof and to forward bias the base-emitter junction of, and thereby to saturate, said second transistor in response to said voltage being at one of its two levels and to bias "off" said second transistor in response to said voltage being at its other level; means for applying a voltage pulse between the collector of said first transistor and said point of reference potential, thereby to derive, in response to the leading edge only of an applied pulse, a signal from the emitter of said first transistor and only when said second transistor is unsaturated, the derivation of said signal being inhibited when said second transistor is saturated, said inhibiting resulting from the clamping of said first-transistor base to said reference potential by said saturated second transistor; and means for utilizing said derived signal to change the voltage level of said voltage source.

7. A complementing flip flop comprising: eight junction transistors each having emitter, base and collector, two of said transistors functioning as the flip flop per se, two others functioning as triggers for said flip flop, two different others functioning as steering gates, and the remaining two functioning as gate inhibitors; conductive means connecting the emitters of said flip-flop transistors and of said trigger transistors and of said gate-inhibitor transistors directly to a point of reference potential; conductive means connecting the collector of each of said trigger transistors directly to the collector of a different one of said flip-flop transistors; conductive means connecting the collector of each of said trigger transistors directly to the base of the other of said flip-flop transistors; conductive means connecting the base of each of said gate-inhibitor transistors directly to the collector of a different one of said flip-flop transistors; conductive means connecting the emitter of each of said steering-gate transistors directly to the base of a different one of said trigger transistors; conductive means connecting the base of each of said steering-gate transistors directly to the collector of a different one of said gate-inhibitor transistors; resistive means for connecting the collector of each of said flip-flop transistors and the collector of each of said trigger transistors to a source of direct-current voltage; means for connecting the collector of each of said steering-gate transistors to the same one terminal of a common source of pulse voltage; and means for connecting the other terminal of said common source to said point of reference potential, whereby when said voltage pulse is applied, the gate-inhibitor transistor which is conducting, due to its base being connected to the collector of the flip-flop transistor which is "off," effectively clamps at reference potential the base of the steering-gate transistor to which its collector is connected, thereby inhibiting passage of a signal through the said steering-gate transistor to the base of the trigger transistor which controls the "off" flip-flop transistor, but whereby the gate-inhibitor transistor which is "off," due to its base being connected to the collector of the flip-flop transistor which is "on," is ineffective to prevent the base of the steering-gate transistor to which its collector is connected from being forward biased by said applied voltage pulse and a signal passes through the said steering-gate transistor to the base of the trigger transistor which controls the "on" flip-flop transistor, thereby to turn "on" said last-named trigger transistor and thereby to turn "off" the flip-flop transistor which had been "on."

8. In a complementing flip-flop circuit, a pair of electronic gates, each of said gates comprising: first and second transistors each having an input electrode, an output electrode and a third electrode which functions as a common input-output electrode; means connecting the input electrode of said first transistor directly to the output electrode of said second transistor; means connecting the common electrode of said second transistor directly to a point of reference potential; means connecting the input electrode of said second transistor to an output circuit of said flip flop to sense the state of said flip flop and to bias "on" and thereby saturate said second transistor in response to said flip flop being in one of its two stable states and to bias "off" said second transistor in response to said flip flop being in its other state; means for applying an input pulse between the common electrode of said first transistor and said point of reference potential, whereby in response to the leading edge only of an applied input pulse a signal appears at the output electrode of said first transistor only when said second transistor is unsaturated, the appearance of said signal at the output electrode of said first transistor being inhibited when said second transistor is saturated, said inhibiting being due to the clamping of said input electrode of said first transistor to said point of reference potential by said saturated second transistor; and means for utilizing the signal appearing at the output electrode of said first transistor to change the state of said flip-flop circuit.

References Cited in the file of this patent

UNITED STATES PATENTS

| | | |
|---|---|---|
| 2,666,852 | Hollingsworth | Jan. 19, 1954 |
| 2,681,996 | Wallace | June 22, 1954 |

FOREIGN PATENTS

| | | |
|---|---|---|
| 762,867 | Great Britain | Dec. 5, 1956 |